MECHANIZED CABINET TYPE FILE

Original Filed Oct. 23, 1961 10 Sheets-Sheet 1

INVENTOR.
WALTER G ANDERS
BY
C. H. Miranda
ATTORNEY

MECHANIZED CABINET TYPE FILE

Original Filed Oct. 23, 1961 10 Sheets-Sheet 2

INVENTOR.
WALTER G ANDERS

BY

C. R. Miranda
ATTORNEY

MECHANIZED CABINET TYPE FILE

Original Filed Oct. 23, 1961 10 Sheets-Sheet 3

INVENTOR.
WALTER G. ANDERS
BY
C. R. Miranda
ATTORNEY

MECHANIZED CABINET TYPE FILE

Original Filed Oct. 23, 1961 10 Sheets-Sheet 4

INVENTOR.
WALTER G. ANDERS
BY
C. R. Miranda
ATTORNEY

MECHANIZED CABINET TYPE FILE
Original Filed Oct. 23, 1961 10 Sheets-Sheet 5
FIG. 6.
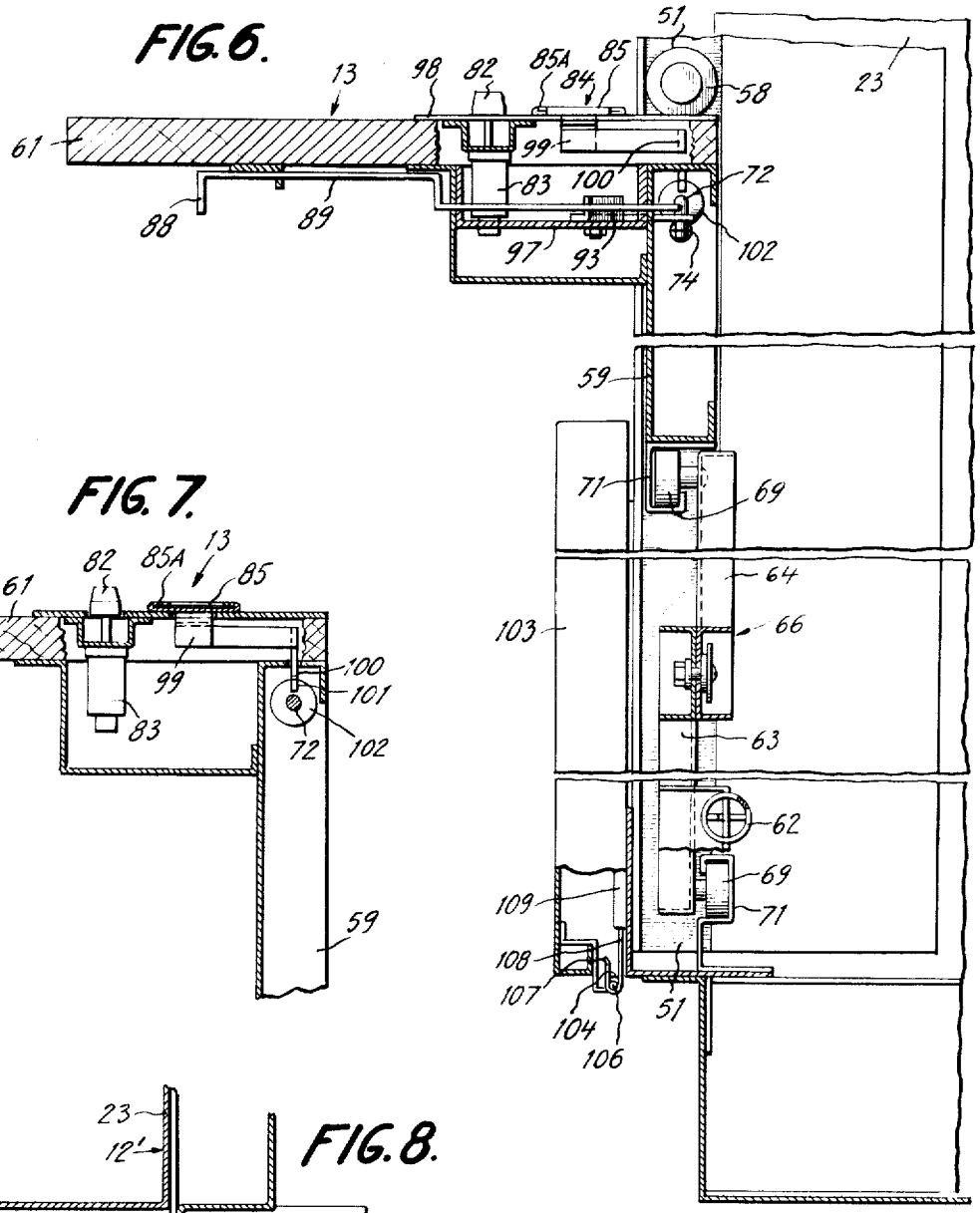
FIG. 7.
FIG. 8.
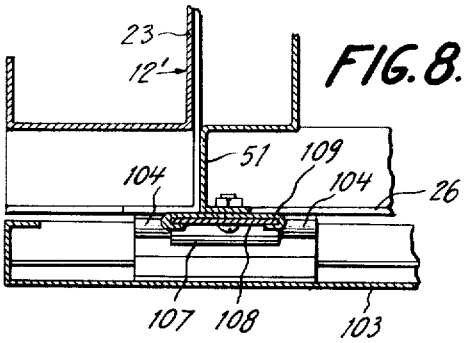
INVENTOR.
WALTER G ANDERS
BY
C. H. Miranda
ATTORNEY

MECHANIZED CABINET TYPE FILE

Original Filed Oct. 23, 1961 10 Sheets-Sheet 6

INVENTOR.
WALTER G. ANDERS

BY

C. R. Miranda
ATTORNEY

MECHANIZED CABINET TYPE FILE

Original Filed Oct. 23, 1961 10 Sheets-Sheet 7

INVENTOR.
WALTER G. ANDERS

BY

C. H. Miranda
ATTORNEY

MECHANIZED CABINET TYPE FILE

Original Filed Oct. 23, 1961 10 Sheets-Sheet 8

INVENTOR.
WALTER G. ANDERS

BY

C. A. Miranda

ATTORNEY

MECHANIZED CABINET TYPE FILE

Original Filed Oct. 23, 1961 10 Sheets-Sheet 9

INVENTOR.
WALTER G. ANDERS
BY
C. R. Miranda
ATTORNEY

MECHANIZED CABINET TYPE FILE

Original Filed Oct. 23, 1961 10 Sheets-Sheet 10

INVENTOR.
WALTER G ANDERS

BY C. R. Miranda
ATTORNEY

United States Patent Office

Re. 25,919
Reissued Nov. 30, 1965

25,919

MECHANIZED CABINET TYPE FILE

Walter G. Anders, Canton, Ohio, assignor to Sperry Rand Corporation, New York, N.Y., a corporation of Delaware Original No. 3,105,727, dated Oct. 1, 1963, Ser. No. 146,857, Oct. 23, 1961. Application for reissue Feb. 11, 1965, Ser. No. 450,229
20 Claims. (Cl. 312—223)

Figure 1:
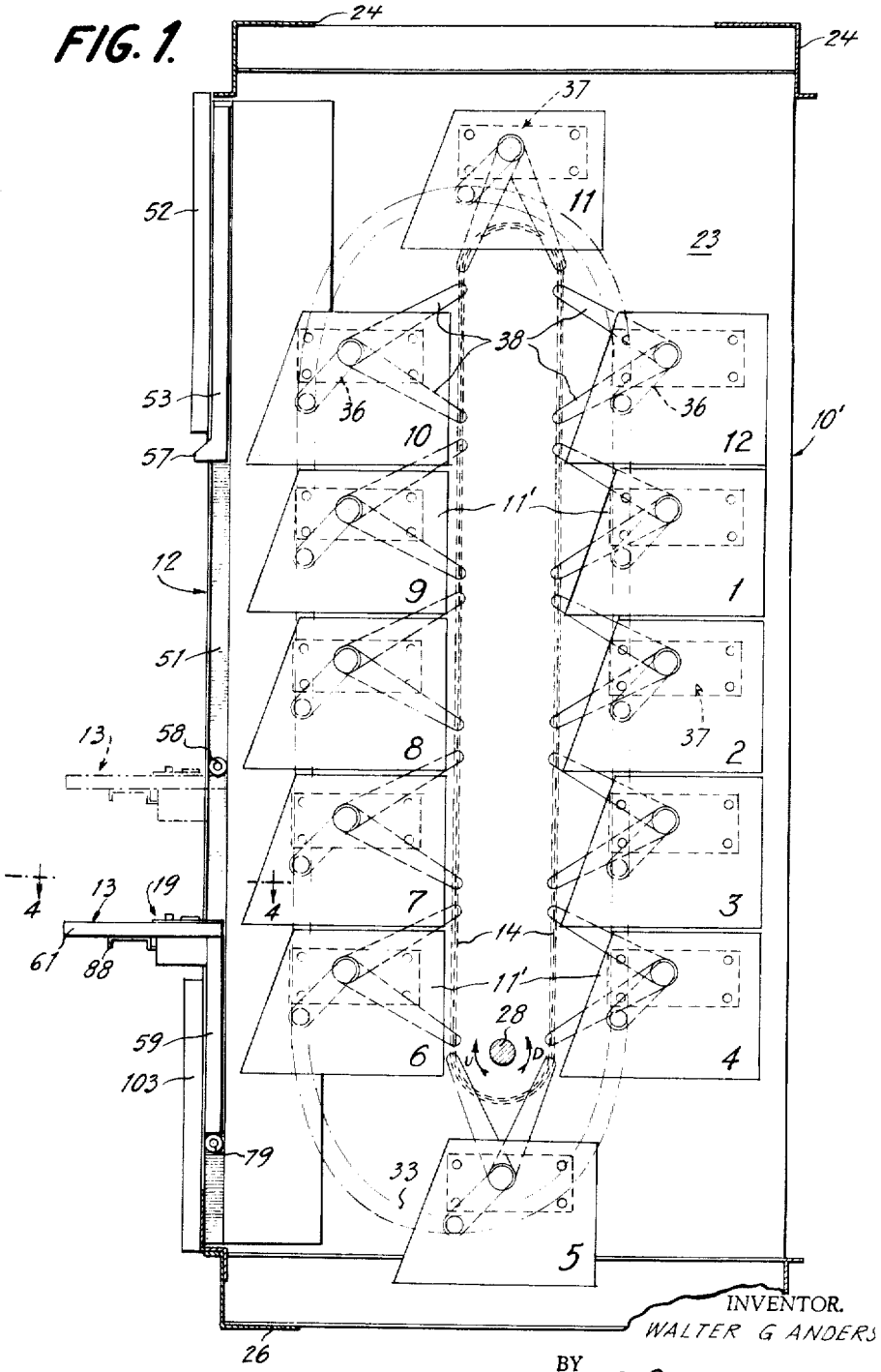

Matter enclosed in heavy brackets [ ] appears in the original patent but forms no part of this reissue specification; matter printed in italics indicates the additions made by reissue.

This invention relates to office record equipment and in particular to a cabinet type file having an access opening in the front thereof to which travelling record holding carriers are brought.

Satisfactory use has been made of cabinet files for the holding of card files or trays in which the files move horizontally past an opening. However, a mechanized file in which letter or legal size file carriers can be handled automatically, or wherein the height of the carriers is increased to accommodate a plurality of tiers of trays or drawers, presents a problem due to the cumbersome nature of such file carriers and the fact that an operator may wish to stand up or be seated while working from a selected file carrier. Further, the file carriers being much larger than single card drawers or trays the design of the file such as the one herein contemplated must include structure that will keep the device at a minimum overall size.

An object of the invention is to provide a novel cabinet type file wherein a record holding carrier is selectively positioned in a variable sized access opening in the cabinet.

Another object of the invention is to facilitate the use of the file by an operator in either a standing or a sitting position and to provide for a file posting location at which the operator may have convenient access to a selected file while working at either position.

Another object of the invention is to provide a suitable mechanical file for the handling of file carriers that are relatively more cumbersome than present day single tier card handling equipment and at the same time provide equipment that saves costly office space.

A still further object is to provide not only for automatic control of the file carriers in accordance with table height adjusting means but also control of the file carriers selectively by the operator and independently of said automatic control.

Still further objects include: the provision of means whereby the file posting location can be varied for the comfort and convenience of the operator in either a sitting or a standing position and which location the operator may adjust with respect to an access opening with a minimum of effort and time; the provision of means for mechanically operating the file or record receptacles so that they can be selectively brought to proper position in an access opening, quietly and with a minimum of time; and the provision of means for automatically controlling the working position of files in an access opening in accordance with the adjustment of a work table to permit the operator to work standing up or sitting down.

Other objects of the invention will be pointed out in the following description and illustrated in the accompanying drawings which disclose, by way of example only, the principle of the invention and the best modes which have been contemplated, of applying that principle.

Figure 2:
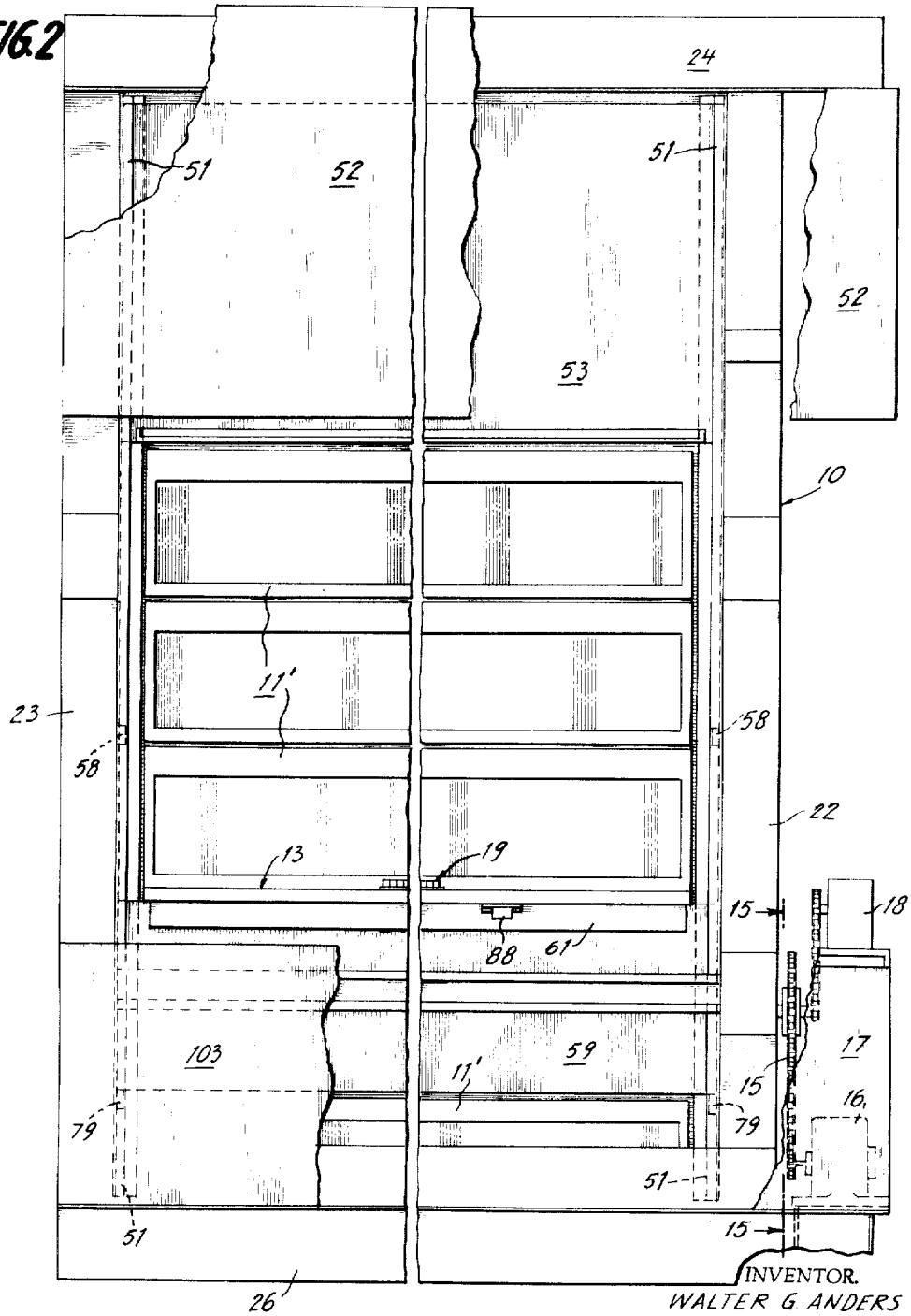
Figure 3:
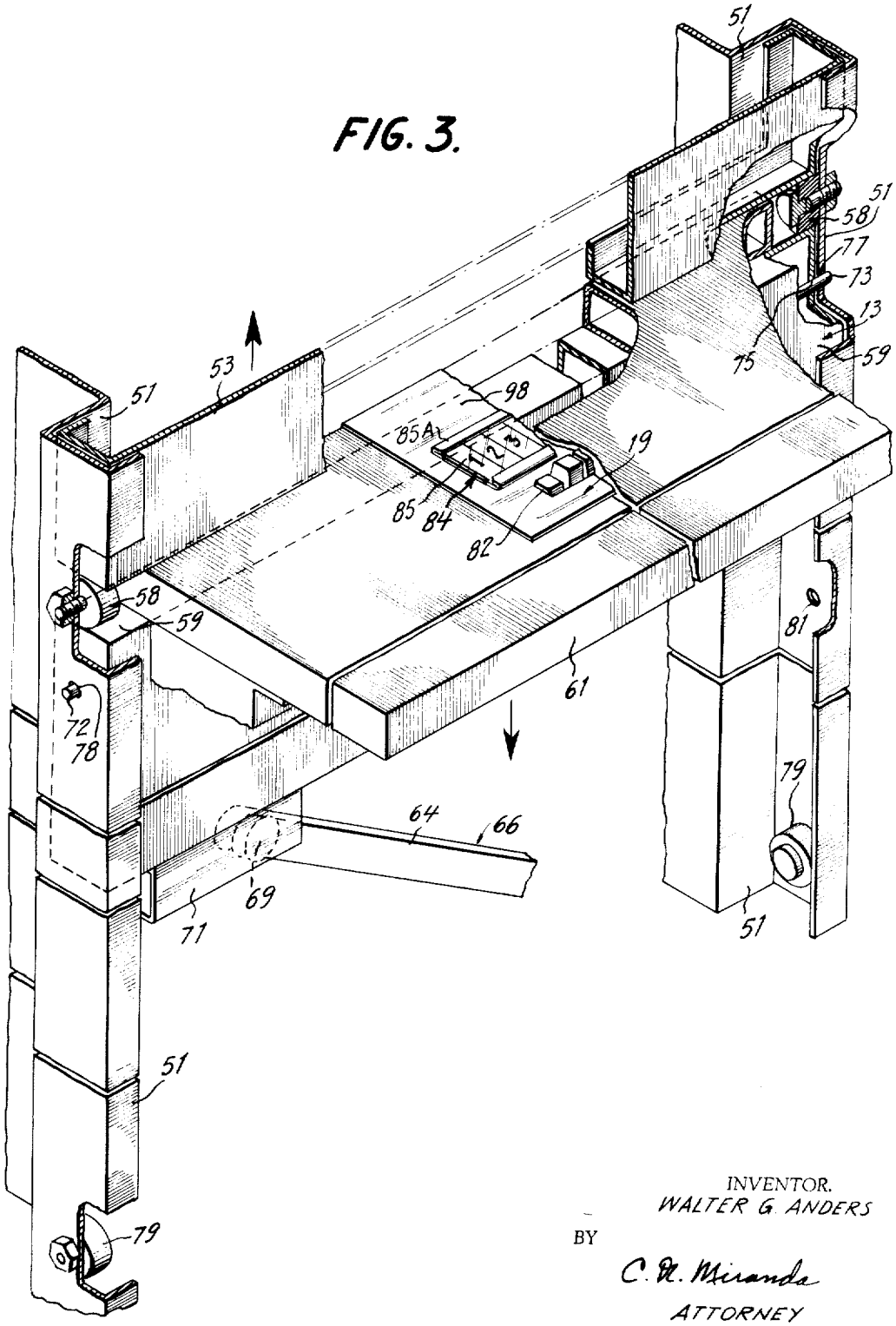
Figure 4:
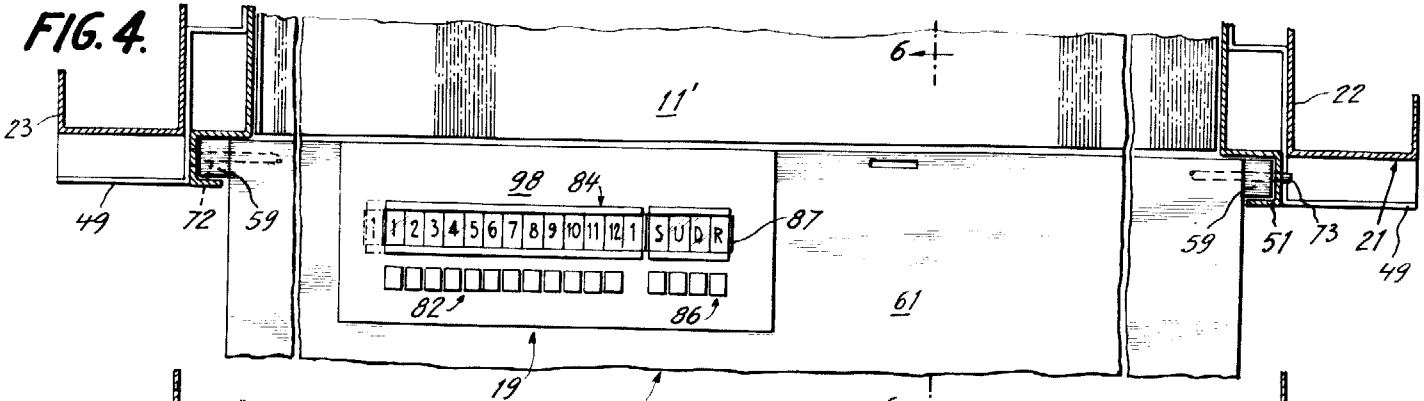
Figure 5:
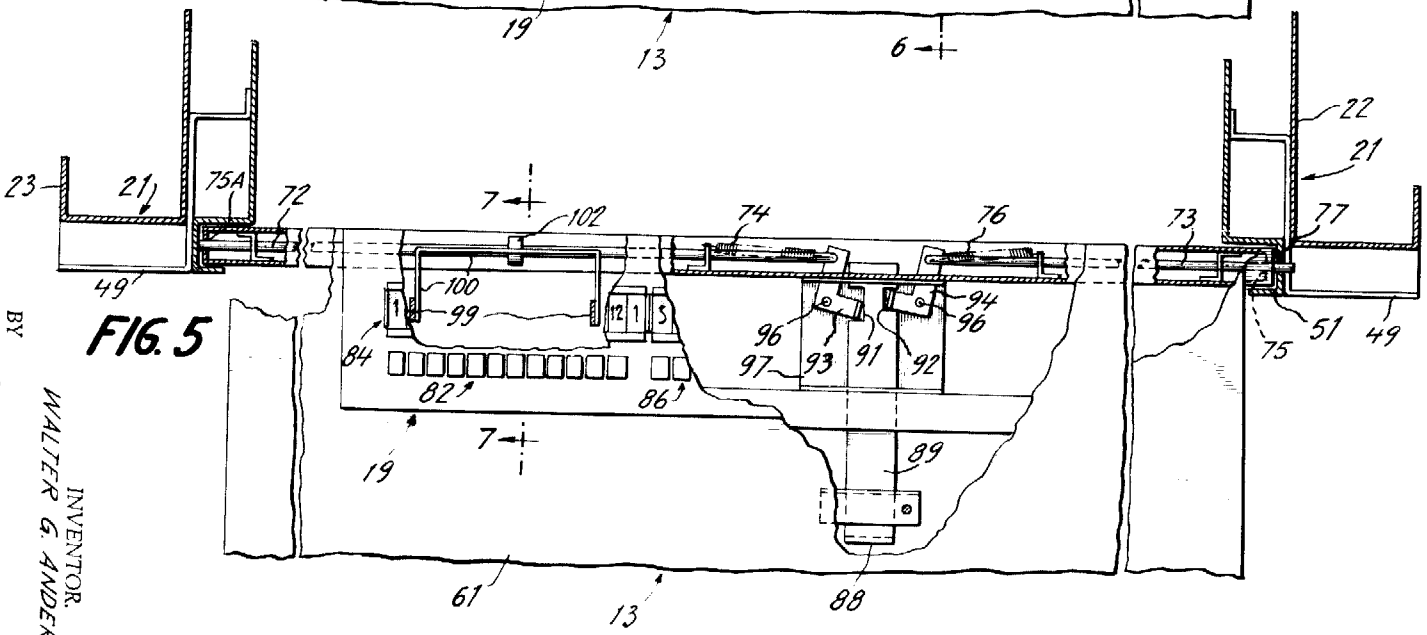
Figure 9:
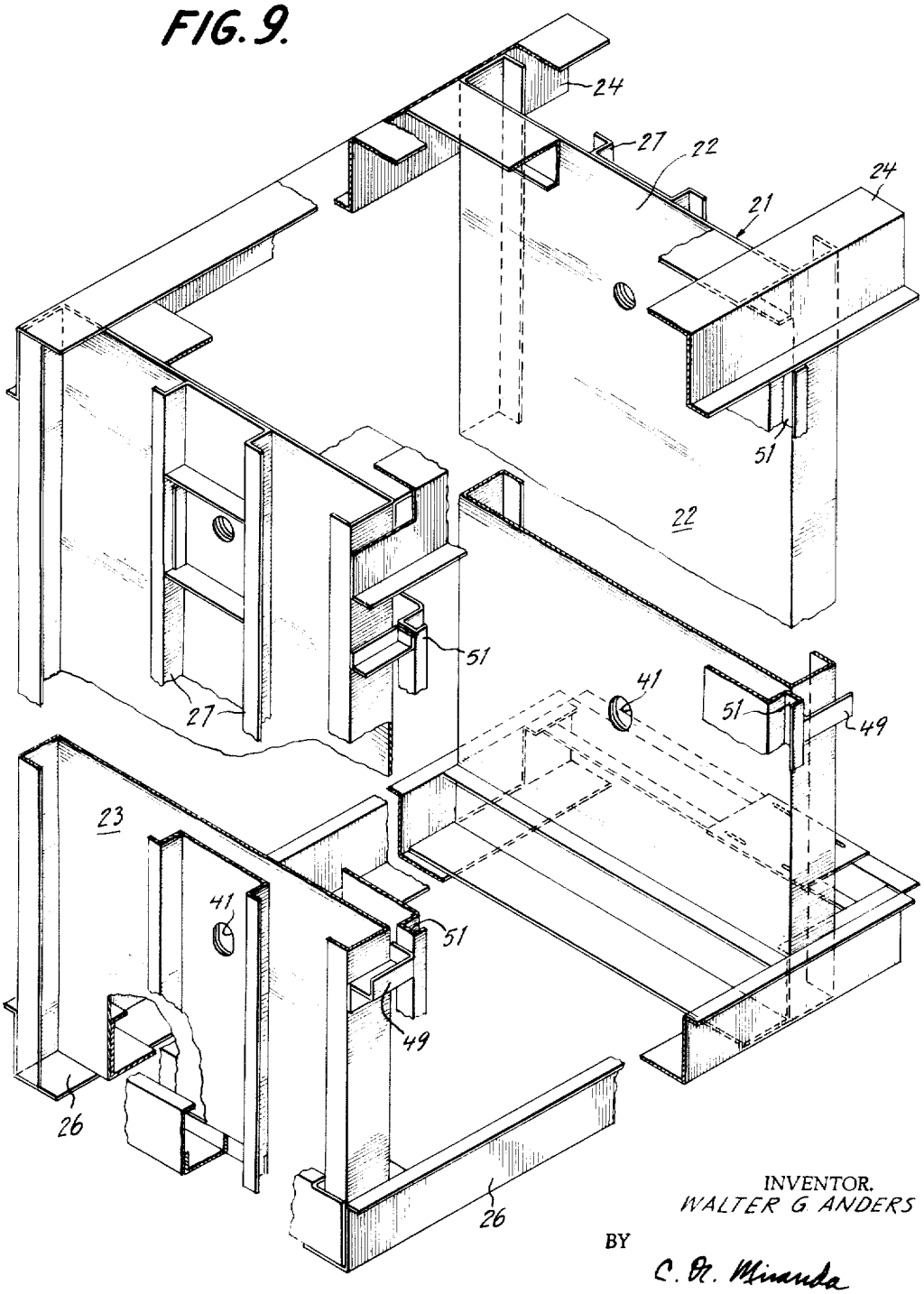
Figure 10:
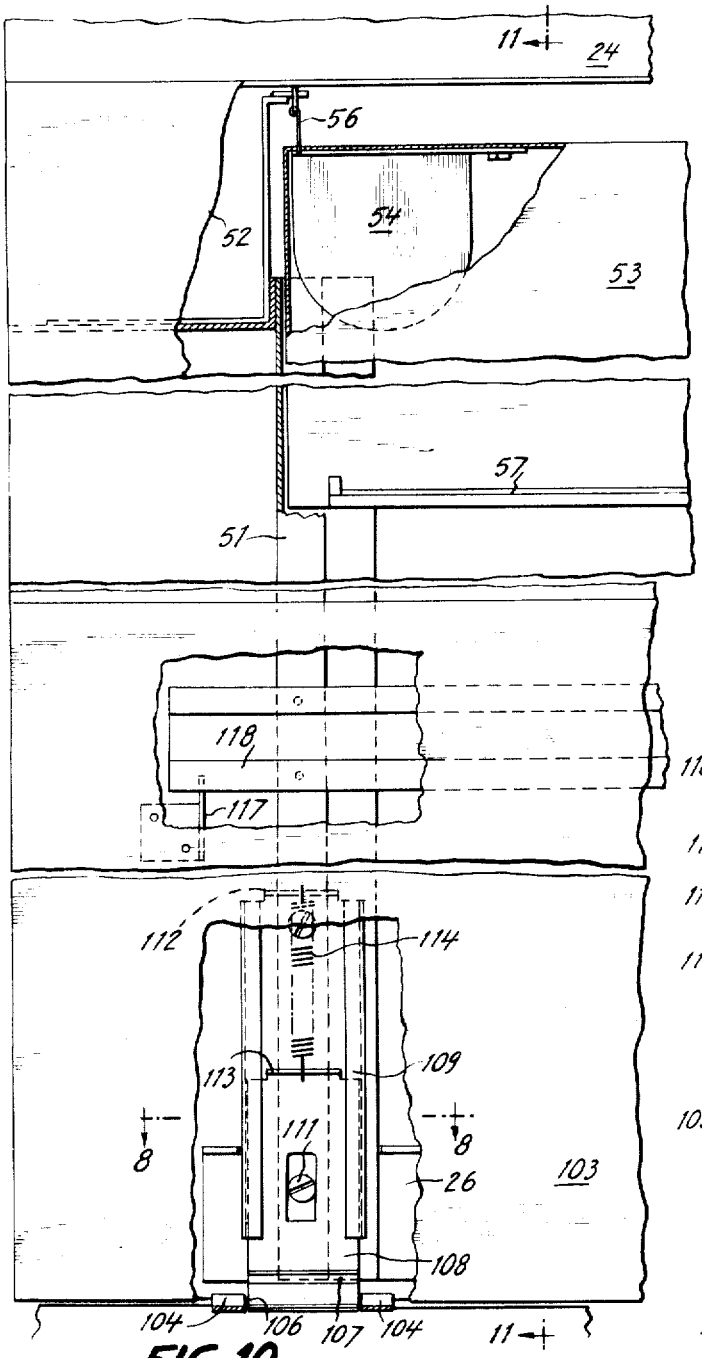
Figure 11:
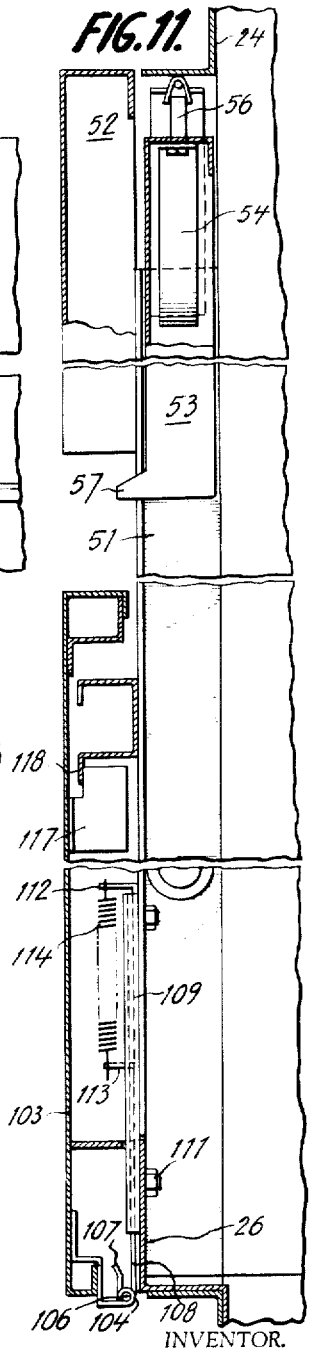
Figure 12:
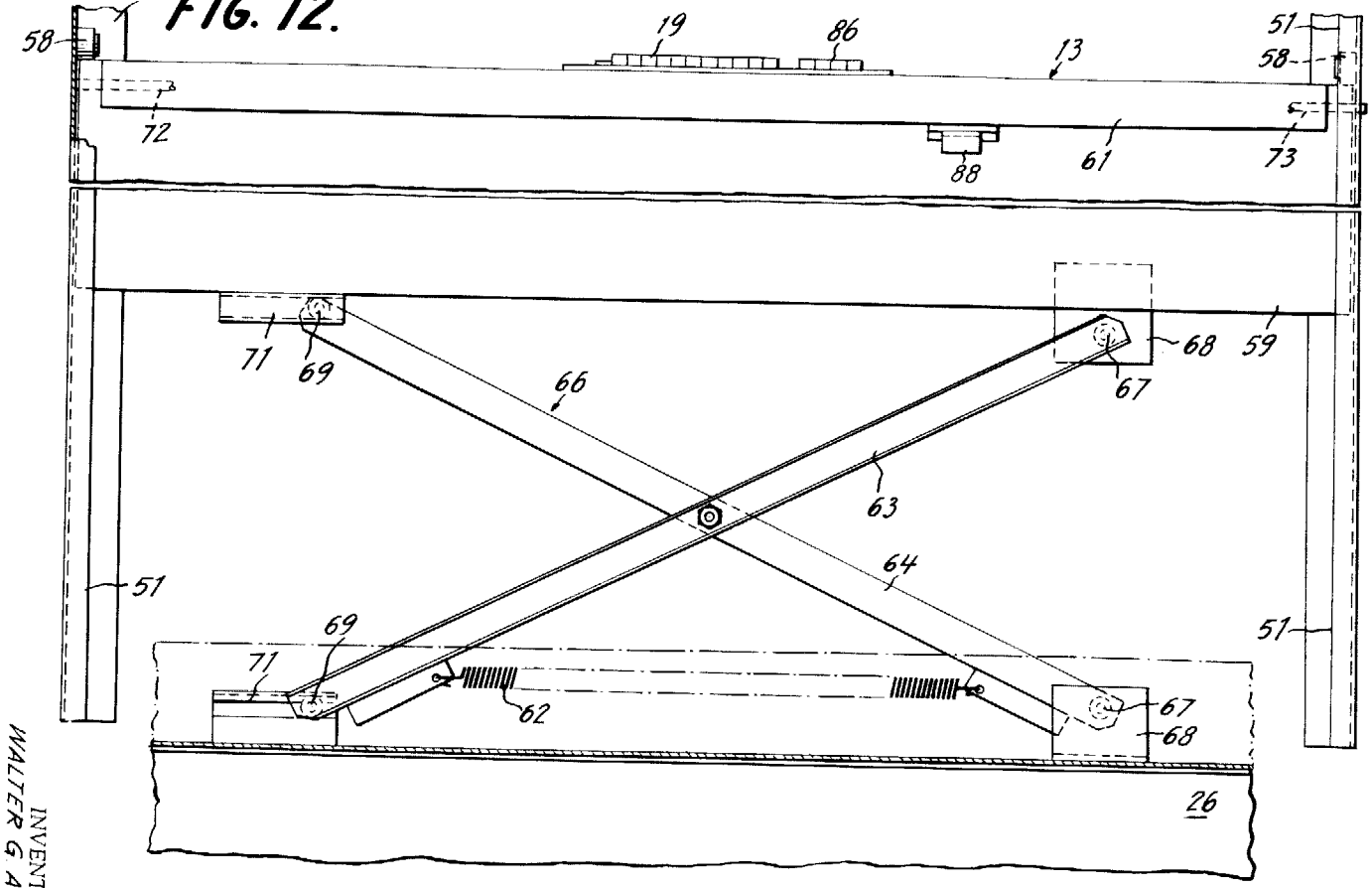
Figure 13:
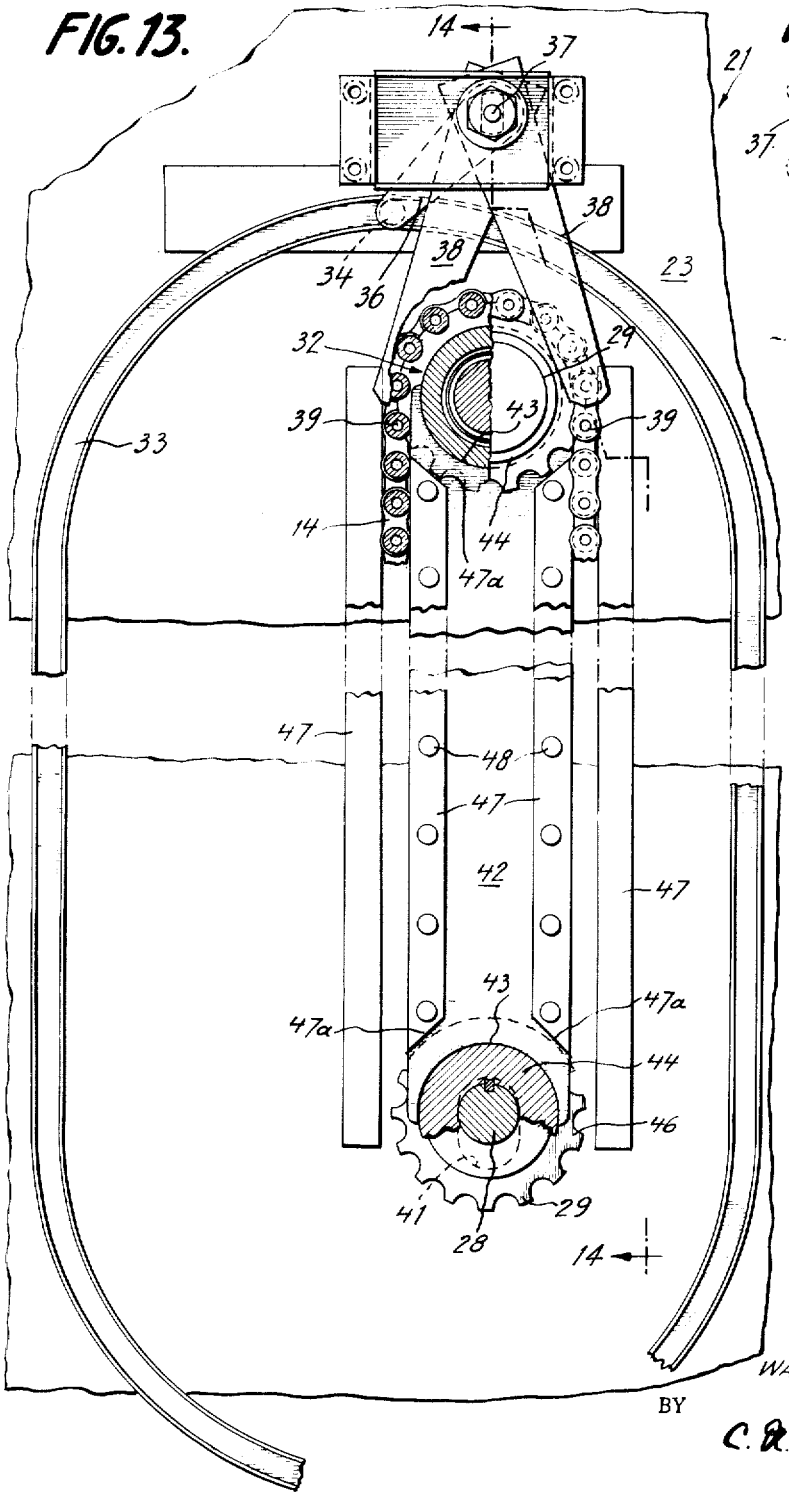
Figure 14:
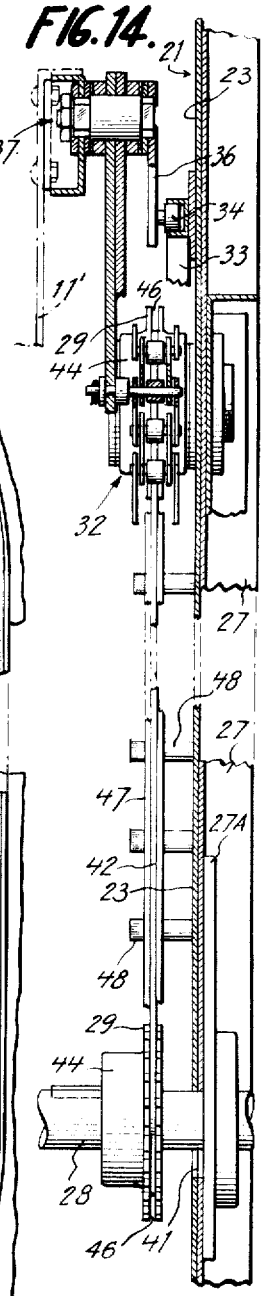
Figure 15:
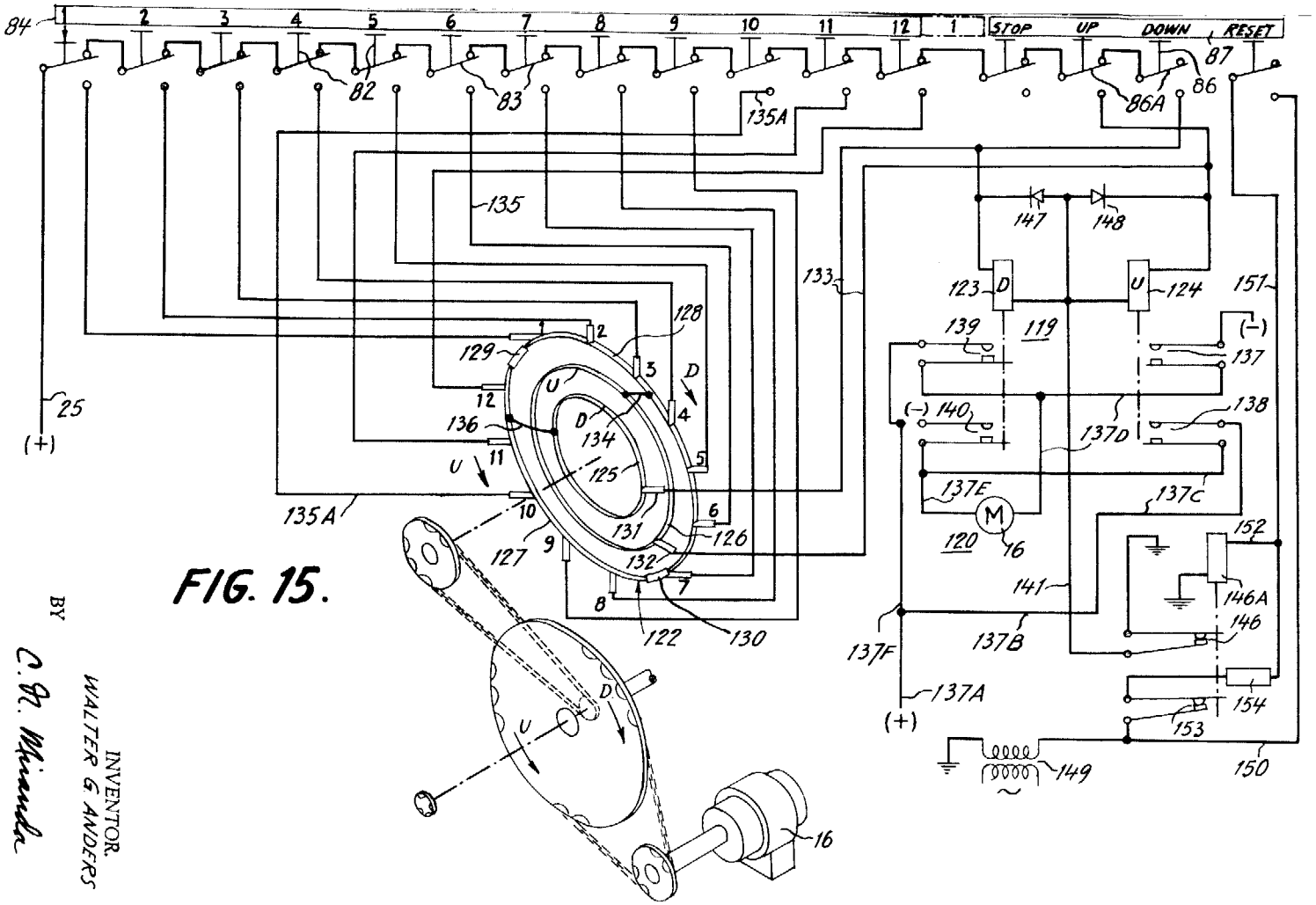

In the drawings:

FIG. 1 is a diagrammatic view in side elevation of a mechanical file constructed in accordance with the invention and showing different positions of the work table, FIG. 2 is a view in front elevation of the file shown in FIG. 1 with parts broken away to show the interior structure, FIG. 3 is a view in perspective of the table mounting section of the main frame, FIG. 4 is a fragmentary section taken on the line 4—4 of FIG. 1 showing part of the table and control keybank, with the table in lower position, FIG. 5 is a view similar to FIG. 4 with parts broken away to show the table adjusting control means, FIG. 6 is a section taken on the line 6—6 of FIG. 4 showing the mounting of the table and the lower panel on the cabinet, FIG. 7 is a section taken on the line 7—7 of FIG. 5 showing the control of the keyboard indicator, FIG. 8 is a section taken on the line 8—8 of FIG. 10 and shows the panel latching structure, FIG. 9 is a view in perspective of the main frame of the machine with parts broken away to show the structure thereof, FIG. 10 is an enlarged fragmentary front view of the machine with parts broken away to show one end structure of the upper door and lower panel portions, FIG. 11 is a vertical section taken on the line 11—11 of FIG. 10 showing the mounting of the door and panel in the main frame, FIG. 12 is a view in front elevation taken at the front of the machine with the lower panel removed to show the table counterbalancing means, FIG. 13 is a view in elevation inside the machine showing the sprocket chain construction with respect to one carrier and the connecting means therefor, FIG. 14 is a section taken on the line 14—14 of FIG. 13 showing the mounting of the chain drive and location of the carrier supporting arms, and FIG. 15 is a wiring diagram of the control circuit used in the machine.

Referring now to the drawings, and more particularly to FIG. 1, the reference numeral 10' indicates generally a file cabinet of vertically rectangular form in which are housed a number of carriers 11' in which files or other records are stored and access to the latter of which is provided through a front opening 12', the extent of which may be varied in accordance with the vertical adjustment of a work or "posting" table 13 from positions allowing an operator to stand or sit at the table during work. The carriers 11', as shown diagrammatically in FIG. 1, are suspended from conveyor chains 14 (FIG. 13) in such a manner that the carriers 11 move up or down by the operation of a sprocket chain driving reversible motor 16 (FIG. 2), disposed in an extended portion 17 of the lower right side of the cabinet 10', along with control circuit means 18 which is electrically governed from a keyboard 19 on the table 13. The motor power is transferred through a chain drive 15 to operate the conveyor chains 14.

The file cabinet is provided with a main frame 21 (FIGS. 9, 13 and 14) which is substantially similar in structure at its right and left sides and includes main frame end panels 22 and 23 secured in upper and lower angle members 24 and 26 respectively, extending across the front and back of the main frame. The end panels may be provided with suitable reinforcing members 27 extending vertically thereof for supporting a vertically adjustable bearing plate 27A carrying a lower shaft 28 (FIGS. 13 and 14), which extends across the width of the cabinet and to opposite ends of which are secured grooved sprocket wheels 29 which operate the sprocket chains 14. Chains 14 pass over upper sprocket wheels 29 which are mounted on stud assemblies 32 journalled in end panels 22, 23 and members 27; stud assemblies 32 being provided rather than a shaft such as 28 to eliminate any possible interference of a shaft with edges of the carriers 11' in their movement along their path of travel. Each of the end panels 22, 23 carries a guide track 33 for rollers 34 mounted on guide arms 36 secured on a stud unit 37 along with carrier arms 38 which diverge from their center in the stud unit to be secured to the riveted ends of pins 39 that form bearings for the rollers of the sprocket chains 14. The combination of these carrier arms 38 and guide arms 36 which operate in unison and in association with each carrier 11', propel the latter and maintain each carrier in horizontal position at all points in its travel. The stud unit 37 has demountable attachment with each end of a carrier so that the latter can be replaced as desired. The lower sprocket shaft 28, is vertically adjustable in elongate openings 41, in the end panels, to permit take up of normal chain wear. The sprocket chain drive (FIG. 13) is substantially suspended as a unit and consists essentially of a center strip 42 the opposite ends 43 of which are shaped to fit snugly about the hubs 44 of the sprocket wheels 29 in a grooved slot 46 (FIG. 14) in each sprocket wheel 29 to prevent any lateral swaying movement of channelled guide tracks 47 along which the chains travel between the sprocket wheels. The tracks 47 are mounted on posts 48 secured in the end panels, and the opposite ends of each inner track are bevelled and shaped as at 47a to match the contour of the sprocket wheels so that the downward pressure of the carrier arms 38 will be unable to force the sprocket chain inwardly with a resulting tip of the carrier.

Referring to FIG. 9, and the frame section 21 of the file cabinet, it will be seen that the front and rear edges of the end panels 22 and 23 are channelled, each front edge providing a support for a bracket 49 to whose turned end is secured, by any suitable means, side rails 51 in the form of vertically extending channels.

The upper front portion of the cabinet 10' is covered by an upper fixed panel 52 (FIGS. 1 and 2) extending the width of the cabinet and secured to the outside front portion of the frame 21 in any suitable manner. As seen in FIGS. 1, 2, 3, 10 and 11, a sliding door 53 is mounted in the side rails 51 and is yieldably held in open or raised position behind the panel 52 by a counterbalancing spring operated tape reel 54 (FIG. 10) the tape 56 of which suspends the door 53 at each upper corner thereof (FIG. 2). Along the lower edge of the door a finger strip 57 is provided which permits the operator to raise or pull the door down with a minimum of effort. As will be later explained, the table 13 has a lower position and an upper position and in the latter position the table may be engaged by a latch type lock (not shown), carried in the lower edge of the upper door, when the latter is down and in contact with stops 58 secured in the side rails 51. The form of the lock is not deemed necessary of illustration as any lock that is suitable may be used, and when in operation, prevents the door from being raised and the table from being lowered so that the contents of the file cabinet are protected.

The side rails 51 (FIGS. 2, 3, 4, 5 and 12) provide vertical guides for the table 13 which is of hollow construction and includes a lower apron portion 59, the side edges of which ride in the rails 51, and an integral horizontal keyboard section 61 formed of lightweight material as for example plastic or wood and of lesser width than the apron portion. At its upper position the table abuts the stops 58 and is maintained in raised position (FIG. 12) by an equalizer structure including a tension spring 62 applying pressure in an upward direction to the pivoted arms 63 and 64 of a parallel linkage 66 formed thereby. At one end, each arm is pivoted as at 67 to mounting brackets 68 one of which is on the underside of the apron portion 59 and the other of which is secured to the bottom of the lower angle member 26.

The free end of the arms have rollers 69 which slide in channelled brackets 71 secured respectively to the apron portion 59 and the lower angle member, as are the brackets 68. The location of the tension spring 62 with respect to the other parts of the equalizer results in a counterbalancing action for holding the table assembly in either its raised or lowered position and which positions will hereinafter be more fully described and also compensates for the weight of the table 13 during operation. For a purpose to be later described, the table 13 carries a set of latch rods 72 and 73 (FIGS. 3, 4, and 5) which are urged to the left and to the right, respectively, by tension springs 74 and 76 so that in the upper limit position of the table 13 the right hand rod 73 projects through a hole 75 in the table and a hole 77 in the side rail 51 and the left hand rod 72 projects through a suitable hole 75A in the table and a hole 78 in the opposite side rail 51.

When the table 13 is at its upper or raised position FIG. 3, at which the operator stands to do "posting" or other work with the files in the carrier from which she is working, the table is held in this raised position by the rods 72 and 73, but when she wishes to work in a seated position, the table is pulled down until it abuts the lower stop rolls 79 in rails 51 as seen in FIGS. 1 and 3. At this point, only the rod 73 engages a hole 81 (FIG. 3) in the lower portion of the rail 51 and holds the table down against the raising pressure of the spring 62, and in contact with detent 79. In the table's lower position (FIG. 4) the free end of rod 72 rides on the surface of the rail in which there is no lower hole.

The table 13 (FIGS. 2 to 8) includes a row of key buttons 82 only one of which is held in depressed position at a time, as are the well known columnar keys of an adding machine to maintain a circuit, through its associated switch 83 (FIG. 6) disposed in the housing area of the keyboard section 61. This circuit, which will be explained later, operates the motor 16 and the sprocket conveyor chains 14. For the purpose of illustration, twelve file carriers 11 are illustrated and it is to be understood that any number desired could be used. Each key button 82 controls the "stop" position of its respectively identified carrier as shown by the numerals one to twelve on an indicator strip 84 mounted for sliding movement in parallel relation adjacent the row of buttons 82. As seen in FIG. 3, when the table is in its upper position, the indicator strip is at a leftward position so that the numeral "one" at the left end thereof is one increment beyond the row of buttons and an extra numeral "one" at the opposite end of the strip is in registry with the extreme right hand button of the key bank. When the table is in the lower position (FIG. 4) the numerals of the indicator strip are in normal registry with the buttons so that if the operator wants the number "one" carrier to come to the front opening 12 and level with the table she presses the button under the "one" of the indicator strip 84 and the motor 16 will stop to place the selected carrier at the opening and level with the table. Operation of the buttons under the other numerals will selectively place the chosen carrier in proper position for access. An auxiliary bank of buttons 86 identified by a fixed indicator 87 having associated switches 86A has the designations "S" for stop; "U" for up; "D" for down, and "R" for reset of the buttons 86 and operates the control means 18 through the circuit.

When the table is to be moved to the upper position, the operator puts the palm of the hand against the front edge of the table keyboard section 61 (FIG. 5) and with the fingers pulls on the finger piece end 88 of a latch rod operating cam strip 89 which is provided on opposite edges with recesses 91 and 92 for engagement by the turned ends of respective levers 93 and 94 which are pivoted as at 96 to a suitable bracket 97 (FIG. 6) in a channelled portion of the keyboard section 61. The lever 94 has connected to its free end the spring 76 and the inner end of latch rod 73, and the turned end of said lever, closely fitting in the recess 92, swings the lever 94 to retract the rod 73 and free it from holding engagement with the hole 81, to ride up the inner surface of side rail 51 to engage hole 77. The recess 91 is elongated so that the turned end of lever 93 can move therein when the end of rod 72, which rides on the inner surface of rail 51, reaches the hole 78 (FIG. 3) in said side rail and snaps into latching position in hole 78, to sustain the table 13 in its raised position, as assisted by rod 73. When the table moves from lower to upper position the location of the table with reference to the access opening 12 changes and in order to compensate for this in the operation of the carriers, the indicator strip 84 is moved. Indicator strip 84 consists of an indicia bearing sheet 85 and a plate 85A having its longitudinal edges turned inwardly to hold the sheet 85. Plate 85A moves in a suitably slotted plate 98 forming part of the keyboard section 19 of the table. Secured to plate 85A are depending ears 99 and a connecting bail arm 100 (FIG. 6) slotted in its under mid-section as at 101 to straddle a shift disk or collar 102 secured to the slide rod 72. Thus, as the table reaches its upper position, the rod 72 snaps into the hole 78 under the influence of spring 74, forces the turned end of lever 93 into engagement with the inner end of the recess 91 which acts as a limit stop for the rod and also accurately positions the indicator 84 with respect to the adjacent row of buttons 82. This movement of the slide 84 changes the relation of the numerals on the slide and the buttons 82 of keyboard 19 by one increment or number so that the first left hand button 82 that was designated as "1" when the table was in low position will now be identified as "2" and likewise with the other buttons including the "12" button on the right end of the bank which will be designated as "1" when the table is raised. With this arrangement of the numerals on the indicator and the corresponding order of the carriers "one to twelve," as designated thereon (FIG. 1) it will be seen that, with the table 13 at low position, depression of button "1" will stop carrier "1" at table level. Now if the table is lifted to its upper position the indicator 84 is shifted so that "1" thereon registers with the first right hand button which was designated as "12" when the table was in low position. If the operator wishes to select carrier "1" with the table at raised position she will press the first right hand button, which is now designated as "1," with the result that the carriers will move one increment of travel to position the "1" carrier at the upper level which is the equivalent of bringing carrier 12 to the lower access opening with the table in its lower position. The difference in the high and low position of the table is the same as one increment of movement of the carriers. The position of any adjacent carrier in the opening can be controlled from the auxiliary keyboard 86. The operator, being familiar with the order of the carriers can readily use the auxiliary buttons "U" or "D" to bring any carrier to position for use thus making it possible to operate the file with a minimum of time.

The lower front portion of the cabinet 10' (FIGS. 1, 8, 10 and 11) is closed by a detachable panel 103 extending the entire width of the cabinet and mounted on the outer surfaces of the side rails 51 and the bottom angle member 26 of the frame. The panel 103 is hollow and has at two spaced points along its lower front edge spaced twin sleeves 104 carrying a pin 106, the mid-portion of which pin detachably seats in the hooked lower end 107 of a vertical slide piece 108 which rides in a channeled guide 109 secured to the bottom angle member 26 by a bolt 111 forming a bolt-in-a-slot limit stop with the slide piece 108. The guide 109 at its upper end has a lip 112 similar to a lip 113 on the upper end of the slide piece 108 and between which lips is disposed a tension spring 114. When it is desired to remove the panel 103, the top of the panel is pushed down against the resistance of spring 114 until spaced hooks 117 inside the panel are free of an anchor strip 118 extending across the side rails 51. The panel can then be raised, with an assist from the springs 114, and the pins 106 lifted out of the lower hooked ends 107 of the slide pieces 108. The panel can be also swung out without detachment to rest on the floor so that papers accidentally dropped into the cabinet from the work table can be readily retrieved.

Referring to the wiring diagram of FIG. 15, the circuit comprises a relay loop 119 and a motor loop 120, and in the circuitry of the loop 119 is included a commutator 122. The commutator is connected in circuit with the selector push button switches 83 of key buttons 82 designated by the adjustable indicator 84 as "1 to 12" when the table is in its lower position. Commutator 122 also is connected to "Down" and "Up" relay coils 123 and 124 respectively, which are grounded through line 141 and switch 145 in loop 119. The commutator 122 is made up of inner and outer electrically conducting continuous rings 125 and 126 also designated as "D" and "U" respectively. The outer split ring is made up of ring segments 127 and 128, each of which is adapted for sliding engagement with brushes designated 1 to 12 and connected to switches 83, and each segment is insulated from the other by insulator sections 129 and 130. All three commutator rings rotate in unison in the desired directions, either counterclockwise or clockwise, or up or down, as designated by the arrows "U" and "D" respectively (FIG. 15). The number of brushes or contacts "1 to 12" corresponds to the "1 to 12" carriers 11', as designated thereon in FIG. 1, and which carriers move up or down in the directions designated by the arrows "U" and "D" illustrated on sprocket 29 in FIG. 1 in response to commutator 122. The spacing between the brushes is proportional to the spacing between the carriers 11'. The commutator 122 is mounted, with respect to the brushes or contacts "1 to 12" and the brushes or contacts 131 and 132 connecting the "Up" and "Down" switches 86A of the auxiliary keyboard or bank of buttons 86, so that insulator 130 will always be disposed under the brush of the selected carrier located at the lower access position. Insulator 129 is positioned on commutator 122 so as not to align with a switch brush "1 to 12" when a carrier is stopped at the lower access position. The brushes or contacts "1 to 12" engage the ring segments 127 and 128 and the brushes or contacts 131 and 132 are connected respectively with the "Down" and "Up" switches 86A through the lines 133. The outer "U" complete ring 126 is connected to the outer ring segment 128 of commutator 122 by a connector 134, while the inner "D" complete ring 125 is connected to the outer ring segment 127 by a connector 136.

Line 25 is connected to a source of electrical energy or a D.C. power source and also is connected to key button switches 83 and by means of series connections between the switches current is made available so that when any of the series connected switches is operated to close its normally open contacts, the current is removed from all succeeding switches.

With the table in lower access position (FIG. 1) let us assume that the file carrier "7" is at working position with insulator 130 disposed beneath brush 7 and that the operator wishes file carrier "6" brought to lower access position. Operation of button "6," as designated by the indicator, will supply current to brush "6" through line 135, ring segment 128, connector 134, ring segment 126, contact 132, and line 133 to the relay coil 124 (U) which will close the normally open relay switches 137 and 138 with the result that a circuit will be established through motor circuit lines 137B, 137C, switch 138, line 137E and switch contacts 137 of loop 120 from a power line 137A to cause the motor 16 to move the conveyor up in the direction designated by arrow "U" in FIG. 1, as seen through the front opening 12 of the cabinet. This operation of the motor will revolve the commutator through U ring 128 in the direction of arrow "U" in FIG. 15 to bring the insulator section 130 beneath the brush "6" and so stop the motor with the carrier "6" at the desired position level with the table. As viewed in FIGS. 1 and 15 the commutator 122 and the conveyor move in opposite directions, however commutator 122 and the conveyor actually move in the same direction during operation.

Now let us assume with carrier "7" at the lower access position (FIG. 1) that the operator wishes to stand up and work out of carrier "11" and raises the table to the upper access position, as indicated in outline in FIG. 1, which will automatically shift the indicator 84 so that now "11" is over the button 10 (which was indicated as "10" when the table was in lower access position). Actually the connection from the now designated "11" button is to the "10" contact on the commutator segment 127. When the operator presses the "11" button, power through line 135A to contact "10" on ring segment 127 will supply current through connector 136, inner "D" ring 125, contact 131, and line 133 to the down relay coil 123. This will close the normally open relay switch contacts 139 and 140; and through lines 137A, 137F, switch contact 139, line 137D, line 137E and switch contacts 140 the current is reversed through motor 16 to move the conveyor downwardly in the direction of arrow "D" (FIG. 1) and commutator 122 will revolve in the down direction as designated by arrow "D" in FIG. 15 until insulator 130 comes beneath the "10" contact to stop the "11" carrier at the upper position of access as defined by the raised table. It is to be noted that the distance between upper and lower access positions corresponds to the distance between the contacts on the commutator.

The auxiliary keyboard 87 permits the operator to raise or lower the files as desired independently of the key switches 83 by operating the switches 85 of the bank 86 of buttons designated "Up" and "Down" and to stop the operation of the motor by breaking the circuit from power source 25 by pressure on the "Stop" button. When the "Down" button is pressed the current is supplied to the coil 123 whose circuit, along with coil 124 is completed through line 141 and relay contacts 146 of a relay 146A which contacts are closed during operation of the conveyor in up or down directions subject to being opened by appropriate safety devices as will be hereinafter described. When the "Up" button is pressed, the coil 124 is energized and the motor operates to raise the conveyor in the up direction designated by arrow "U" in FIG. 1. Rectifiers 147 and 148 connected in parallel with the relay coils 123 and 124 are for the purpose of reducing the reactive sparking which corrodes the surfaces of the commutator segments 127 and 128 at the insulating portions 129 and 130.

The words "Up" and "Down" as used herein refer to the direction of travel of the carriers at the front of the cabinet.

The "Reset" button is employed to condition the machine for operation either after shutdown or after a safety device operates in response to the occurrence of an unsafe condition. The "Reset" switch completes a circuit which may be traced as follows: the secondary winding of a stepdown transformer 149 connected to an A.C. source, conductor 150, the "Reset" switch contacts, line 151, lead 152, winding of relay 146A, thence to ground. Operation of the "Reset" switch energizes relay 146A to close contacts 146 and 153. Contacts 146 and 153 upon closing complete a holding circuit through safety device generally designated as 154; contacts 146, upon closing prepare the motor loop 120 for operation as previously described. The relay winding remaining energized although the "Reset" switch returns to an open position when pressure on the "Reset" button is removed. Upon the occurrence of an unsafe condition, such as for example an operator's hand extending into access opening 12' while the conveyor is in motion, safety device 154 breaks the holding circuit to the winding of relay 146A, which releases. Relay contacts 146 reopen to deactivate the relay loop 119 and motor loop 120. When the unsafe condition has ceased to exist the "Reset" switch again may be closed to reenergize relay 146A to close contacts 146 and 153 so that operation of the machine may be resumed.

It will be understood that the present invention also is applicable to cabinet files which accommodate pullout type drawers such as found in stationary or floor type drawer files. Thus, the open carriers may be replaced, or have mounted thereon drawers in which folders or other material is placed and selection of the proper set of drawers is accomplished in the same manner as the carriers with access thereto through the access opening. Further, the present invention as disclosed herein describes in detail a linear or straight type indicator strip whereas it is well within the teaching of the present invention to provide a circular indicator strip with buttons disposed about the periphery of the strip and means provided for rotating the strip an incremental amount in either direction upon movement of the table from one position to the other. In addition, the present invention is readily adaptable to a console control which utilizes a telephone dial type control with the circular indicator strip being movable an incremental amount relative to a moveable apertured finger piece.

The invention is not to be restricted to the precise details of construction shown since various changes and modifications may be made therein without departing from the scope of the invention or sacrificing the advantages to be derived from its use.

What is claimed is:

1. A cabinet type file comprising a housing having an opening in one side thereof, a conveyor in said housing, means for operating said conveyor, file carriers mounted upon and movable by said conveyor to different positions of access adjacent said opening, table means on said housing movable in said opening alongside said different positions of access, *said operating means including drive means for moving said conveyor, a plurality of circuits for controlling said drive means to position said file carriers with respect to said opening, a plurality of manually operable devices for selectively energizing said control circuits, a plurality of reference indicia cooperatively associated with said devices to facilitate positioning a desired file carrier adjacent said opening,* and means governed by the movement of said table means for [controlling the operation of said conveyor] *modifying the relation between said reference indicia and said drive means* to bring the carriers to different positions of access adjacent said opening in accordance with the different positions of said table means.

2. A cabinet type file comprising a housing having an opening in one face thereof, a conveyor in said housing, motor circuit means for controlling the operation of said conveyor, file carriers mounted upon and movable by said conveyor to different positions of access adjacent said opening, table means on said housing movable in said opening alongside said different positions of access, key means for governing the operation of said motor circuit controlling means, movable means for identifying the key means for one operation of said motor circuit controlling means when the table is at one position of access in said opening, and means controlled by the movement of said table means for moving said identifying means with respect to the key means for another operation of the motor circuit controlling means when the table is at another position of access in said opening.

3. A cabinet type file comprising a housing having an opening in one face thereof, a conveyor in the housing, file carriers mounted on and movable by said conveyor to different positions of access adjacent said opening, table means movable in said opening alongside said different positions of access, means causing one operation of said conveyor including motor circuit means and a key bank for controlling the motor circuit means, movable indicator means adjacent the key bank having indicia in register with the keys of said bank when the table means is in one of said different positions, and means operable by the movement of said table means to another of said different positions for moving said indicator means to shift the indicia with respect to the keys of said bank and provide for another operation of said conveyor.

4. A cabinet type file comprising a housing having an opening in one face thereof, a conveyor in the housing, file carriers arranged in a numerical sequence and movable by said conveyor to different positions of access in said opening, table means movable in said opening to said different positions of access, means causing one operation of said conveyor including motor control circuit means and a key bank on said table for controlling the motor control circuit means, movable indicator means adjacent the key bank and having indicia in register with the keys corresponding in order to the arrangement of said file carriers when the table is in one position, and means operable by the movement of said table to another position to shift said indicator means whereby the indicia will register with the keys in advanced numerical order to provide for another operation of said conveyor.

5. The invention according to claim 1 wherein said table means includes latch rod means for engaging openings in the housing for holding the table at different positions, and means on said latch rod means for actuating said [conveyor operation controlling] *relation-modifying* means.

6. The invention according to claim 1 wherein said housing comprises a main frame having end panels, upper and lower angle members for maintaining said end panels in spaced relation, reinforcing members on the exterior of said end panels constituting bearings for said conveyor, and guide means constituting side rails for the guidance of said table means.

7. The invention according to claim 1 wherein the conveyor is of the endless type and includes studs in opposite walls of said housing, a shaft extending between the walls of said housing, sprocket wheels having slots provided therein and mounted on said studs and said shaft, sprocket chains for said wheels, a center strip means having ends fitting in the slots of said sprocket wheels, guide track means for said strip means extending between said wheels and mounted on the wall of the housing, and the ends of said guide track means being contoured to coincide with the periphery of said wheels to form a level path for the conveyor.

8. The invention according to claim 1 wherein said housing includes a guide track and each of said file carriers includes a stud unit at the opposite ends thereof, carrier arms extending from said unit and secured at the ends thereof to said conveyor, and guide arms extending from the unit and riding in said guide track to maintain said file carrier horizontal at all operating positions of said conveyor.

9. The invention according to claim 1 in which the table control means includes latch rod means for engagement with openings in the housing, cam means for controlling the operation of said latch rod means when the table is moved to different positions of access, and means in said cam means for controlling the operation of one of said latch rod means when the table is moved to another position.

10. The invention according to claim 3 in which said housing includes side rails, and said table means includes an apron portion slidable in said side rails and constituting a closure for part of said opening when the table means is in one position, a door mounted for sliding movement in said side rails for closing that part of said opening left open by said apron portion, stop means for arresting the movement of said apron portion and door at closed position in said opening, and means for yieldably urging said door to open position.

11. The invention according to claim 3 in which said table means includes an apron portion constituting closure means for part of said opening when the table means is at one position, an equalizer comprising pivoted support arms having opposite ends pivoted to the apron of said table means and the housing respectively, a spring connecting the arms for yieldably urging said table means in one direction, and stop means for limiting the movement of said table means in said direction.

12. The invention according to claim 1 wherein said housing includes slide rails in which said table means is held, a panel mounted on said rails and coacting with the table means for closing part of said opening, anchor means on said rails, hook means on said panel for detachable engagement with said anchor means, mounting means for said panel, and spring means for yieldably maintaining the panel on said mounting and anchor means.

13. The invention according to claim 4 in which said table means includes an auxiliary bank of circuit controlling buttons for governing the operation of said conveyor when the table means is at a selected position of access in the opening in said housing.

14. The invention according to claim 1 in which the means [controlled] *governed* by the movement of the said table means includes keyboard means, a circuit including said keyboard means, commutator means, a reversible motor for operating the conveyor and the commutator means, and relay coil means for controlling the operation of said motor upon rotation of said commutator means in opposite directions.

15. The invention according to claim 1 in which the means [controlled] *governed* by the movement of said table means includes a circuit including keyboard switch keys, a commutator, means for moving the commutator in opposite directions in unison with the movement of said file carriers, contact means on said commutator spaced in accordance with the spacing of said carriers, said commutator having half ring segments with each segment connected in circuit to said switch keys, and means for controlling the movement of the commutator in opposite directions in accordance with the connections of said switch keys whereby the carriers are brought to said positions of access with a minimum of movement of said conveyor.

16. A cabinet type file comprising a housing having an opening in one side thereof, a conveyor in said housing, means for operating said conveyor in opposite directions, file carriers mounted upon and movable by said conveyor to different positions of access adjacent said opening, table means on said housing movable in said opening to said different positions of access, circuit means for controlling the operation of said conveyor, a main bank of key buttons on said table means, a rotatable commutator having half ring portions with which half of said key buttons are in circuit, concentric rings each connected in circuit with a half ring portion and relay means in said circuit for controlling the operation of said conveyor operating means in accordance with circuits activated through said concentric ring and half ring portions of said commutator for bringing the selected carrier to the position of access with a minimum of movement.

17. The invention according to claim 16 including an auxiliary bank of key buttons in said circuit for controlling the operation of the conveyor selectively and independently of said main bank of key buttons.

18. In a cabinet type file of the class described, a housing having an access opening, a file carrier mounted upon and movable within said housing, means for moving said file carrier with respect to said access opening, a table for said housing and movable to one or more positions with respect to said access opening, control means connected for [operating the] *controlling the operation of said* moving means, [said control means being operable in accordance with a desired position of the file carrier within the access opening to effect the selective positioning of the carrier within the opening] *a plurality of*

*reference indicia cooperatively associated with said control means to facilitate positioning a desired file carrier adjacent said opening,* and means operable in response to the movement of said table [to govern the operation of said control means] *for modifying the relation between said reference indicia and said moving means.*

19. In a cabinet type file of the class described, a housing having an opening in one side which includes a file carrier access area therein, a conveyor in said housing, means for operating said conveyor, file carriers mounted upon and movable by said conveyor adjacent said opening, control means controlling operation of said operating means to selectively position a particular file carrier adjacent to and in alignment with said file carrier access area to permit access to said particular file carrier, means for shifting the position of said access area within said opening, [and means for varying the operation of said control] *a plurality of reference indicia cooperatively associated with said control means to facilitate positioning a desired file carrier adjacent said opening, and means for modifying the relation between said reference indicia and said moving* means in accordance with the repositioning of said access area.

*20. A cabinet type file comprising a housing having an opening in one side thereof, a conveyor in said housing, means for operating said conveyor, file carriers mounted upon and movable by said conveyor to different positions of access adjacent said opening, table means on said housing movable in said opening alongside said different positions of access, said operating means including drive*

*means for moving said conveyor, a plurality of circuits for controlling said drive means to position said file carriers with respect to said opening, a plurality of manually operable devices for selectively energizing said control circuits, a plurality of reference indicia cooperatively associated with said devices to facilitate positioning a desired file carrier adjacent said opening, and means governed by the movement of said table means for modifying the relation between said reference indicia and said controlling circuits to bring the carriers to different positions of access adjacent said opening in accordance with the different positions of said table means.*

References Cited by the Examiner

The following references, cited by the Examiner, are of record in the patented file of this patent or the original patent.

UNITED STATES PATENTS

| | | | |
|---|---|---|---|
| 962,933 | 6/1910 | Wallace | 312—134 |
| 1,990,300 | 2/1935 | Miller | 312—223 |
| 2,813,770 | 11/1957 | Scholfield | 312—268 |
| 2,816,000 | 12/1957 | Scholfield | 312—268 |

FOREIGN PATENTS

| | | |
|---|---|---|
| 559,255 | 2/1944 | Great Britain. |

CLAUDE A. LE ROY, *Primary Examiner.*

CHANCELLOR E. HARRIS, *Examiner.*